United States Patent Office 3,464,995
Patented Sept. 2, 1969

3,464,995
18-HYDROXY-YOHIMBANE-CARBOXYLIC ACID DIESTERS
Alfred Popelak, Mannheim, Gustav Lettenbauer, Lampertheim, Hesse, Wolfgang Schaumann, Mannheim-Waldhof, and Annemarie Ribbentrop, Mannheim, Germany, assignors to C. F. Boehringer & Soehne G.m.b.H., Mannheim-Waldhof, Germany
No Drawing. Filed Jan. 4, 1966, Ser. No. 518,556
Claims priority, application Germany, Feb. 4, 1965, B 80,374
Int. Cl. C07d 57/10; A61k 27/00
U.S. Cl. 260—287                    6 Claims

ABSTRACT OF THE DISCLOSURE

Novel 18-hydroxy-yohimbane-carboxylic acid diesters constituting blood pressure reducing agents, corresponding to the formula:

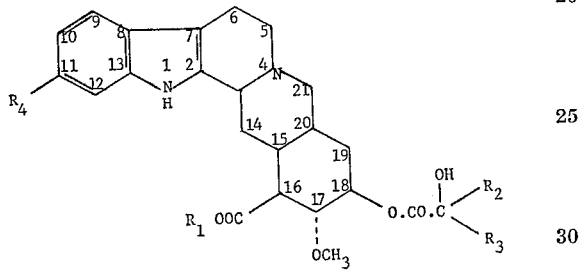

wherein $R_1$ is lower alkyl, $R_2$ and $R_3$ are each hydrogen, alkyl or aryl and $R_4$ is hydrogen or methoxy and the salts thereof with inorganic or organic acids.

---

This invention relates to new 18-hydroxy-yohimbane-carboxylic acid diesters and to novel therapeutic compositions useful for obtaining a reduction in blood pressure.

The new 18-hydroxy-yohimbane-carboxylic acid diesters of the present invention are those which conform to the formula

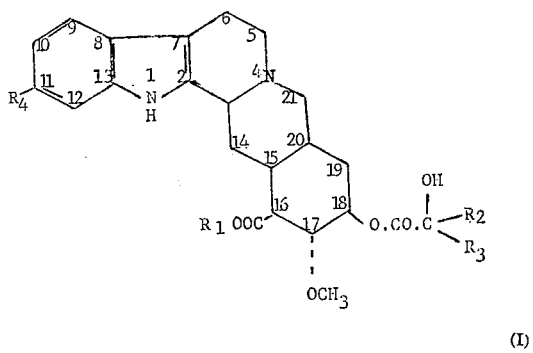

(I)

wherein $R_1$ is lower alkyl, $R_2$ and $R_3$ are each members of the group consisting of hydrogen, alkyl and aryl, and $R_4$ is hydrogen or methoxy, and the salts thereof with inorganic and organic acids. The radical $CR_2R_3$ may also be a cyclic radical.

The new α-hydroxy-carboxylic acid esters of 18-hydroxy-yohimbane-carboxylic acids according to the invention are valuable therapeutic agents and are, in particular, valuable hypotensive agents acting to reduce blood pressure. It has been demonstrated that certain of the diesters of the invention have a shorter period of action and cause a lesser reduction in blood pressure than reserpine. The latter constitutes a particularly important advantage. In addition, the series of α-hydroxy carboxylic acid esters of 18-hydroxy-yohimbane-carboxylic acid esters are very active as sedatives and tranquilizers.

For therapeutic purposes, the bases of general Formula I are preferably employed as such or in the form of non-toxic acid addition salts, i.e., salts containing anions which are relatively innocuous to the animal organism in therapeutic doses of the salts (such as hydrochlorides and other hydrohalides, phosphates, nitrates, sulphates, maleates, fumarates, citrates, tartrates, methanesulphonates and ethanedisulphonates) so that the beneficial physiological properties inherent in the bases are not vitiated by side-effects ascribable to the anions. However, they may also be employed in the form of non-toxic quaternary ammonium salts obtained by reaction with organic halides (e.g., methyl or ethyl iodide, chloride or bromide or allyl or benzyl chloride or bromide) or other reactive esters, e.g., toluene-p-sulphonates.

The new diesters according to the invention can be prepared by reacting monoesters of 18-hydroxy-yohimbane-carboxylic acids of the formula:

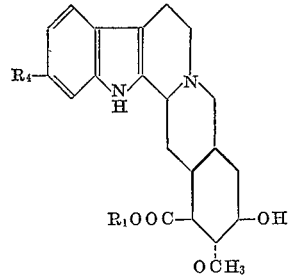

(II)

wherein $R_1$ and $R_4$ are as hereinbefore defined, in the conventional manner with a reactive derivative of an α-hydroxy-carboxylic acid of the formula

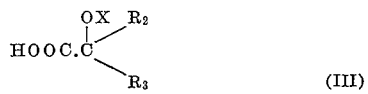

(III)

wherein $R_2$ and $R_3$ are as hereinbefore defined and X is a protective group which is readily split off. Thereafter the protective group X is split off. The product thereby obtained can, if desired, be converted into a salt with an organic or inorganic acid as set out above.

As protective group X for the hydroxyl group, there can be used any radical which can be selectively split off, i.e., without influencing other parts of the molecule, for example, the tetrahydropyranyl, tetrahydrofuranyl, benzyl, and carbobenzoxy radicals. The protective group is thereafter, when the synthesis has been completed, readily split off in the conventional manner by acidification with an inorganic or an organic acid in alcoholic solution.

Included as reactive derivatives of the acids of Formula III, there are to be considered, in particular, acid halides, acid anhydrides and acid imidazolides. A preferred combination is the use of the tetrahydropyranyl radical as the protective group where the reactive acid derivative is a carboxylic acid imidazolide. The esterification then takes place according to the method described and claimed in U.S. Patent 3,113,134. This means that the reaction is effected with a carboxylic acid imidazolide, together with an alkali metal hydride, such as sodium hydride, in an inert solvent, such as, for example, dimethylformamide, at temperatures between 0° C. and 50° C. It is also advantageous to use, instead of the pure carboxylic acid imidazolide, its mixture with imidazole such as is obtained in the case of the reaction of the carboxylic acid with N,N'-carbonyl-diimidazole.

Since the monoesters of general Formula II are optically-active, in the case of the esterification with racemic hydroxy acid derivatives, the formation of two diastereomeric products is to be expected. This, indeed, takes place and the diastereomeric 18-hydroxy-yohimbanecarboxylic acid diesters which are formed in the reaction can be separated, for example, by fractional crystallization or column chromatography. As is to be expected, in the case of esterification with optically pure hydroxy acid derivatives, the products obtained are homogeneous.

The invention will be described more fully in conjunction with the following examples. It will be understood, however, that these examples are given by way of illustration only, and that the invention is not to be construed as limited in spirit or in scope by the details set forth. It will be apparent to chemists skilled in the art of organic synthesis that many modifications in materials, conditions and methods may be made without departing from the invention.

EXAMPLE 7.—18(D)-MANDELIC ACID ESTER OF RESERPIC ACID METHYL ESTER (a) 4.14 g. reserpic acid methyl ester and 4.6 g. O-tetrahydropyranyl-(D)-mandelic acid imidazolide (crude product) were dissolved in 60 ml. anhydrous dimethyl formamide and mixed at 0° C. with 0.48 g. of a 50% suspension of sodium hydride in paraffin oil. After 15 minutes at room temperature, the reaction had been completed. The reaction mixture was then poured into 500 ml. ice water and shaken out several times with methylene chloride. The combined methylene chloride extracts were washed with water, dried over anhydrous sodium sulphate and brought to dryness in a vacuum. The residue (6.5 g.) was chromatographed on basic aluminum oxide of activity stage III, using methylene chloride as solvent. The 18-(O-tetrahydropyranyl)-(D)-mandelic acid ester of reserpic acid methyl ester was eluted from the column first. The yield amounted to 5.9 g. (94% of theory). The compound was recrystallized from diisopropyl ether acetone; M.P. 226° C.;

$[\alpha]_D^{20} = -76.8 \pm 0.6°$ (c.=1% in chloroform).

Analysis.—$C_{36}H_{44}N_2O_8$ (M.W. 632.75). Calc.: C, 68.33%; H, 7.01%; N, 4.43%. Found: C, 68.29%; H, 7.58%; N, 4.46%.

(b) 2.65 g. of the 18-(O-tetrahydropyranyl)-(D)-mandelic acid ester of reserpic acid methyl ester thus obtained were dissolved in a mixture of 200 ml. methanol and 40 ml. methylene chloride and mixed with 1.46 g. p-toluene-sulphonic acid. The reaction mixture was allowed to stand under nitrogen for 20 minutes at 40° C. After dilution with 100 ml. water, the reaction mixture was neutralized with ammonia and the solvent distilled off in a vacuum down to a volume of 100 ml. After the addition of water, the concentrate was rendered alkaline with ammonia and shaken out several times with methylene chloride. The methylene chloride extracts were washed with water, dried over anhydrous sodium sulphate and brought to dryness in a vacuum. The residue (2.33 g.) was recrystallized from isopropanol-methylene chloride. There were thereby obtained 2.10 g. of the 18-(D)-mandelic acid ester of reserpic acid methyl ester in the form of colorless crystals having a melting point of 248–249° C. The melting point did not change upon further recrystallization $[\alpha]_D^{20} = -131.8 \pm 0.6°$ (c.~1% in chloroform).

Analysis.—$C_{31}H_{36}N_2O_7$ (M.W. 548.6). Calc.: C, 67.86%; H, 6.62%; N, 5.10%. Found: C, 67.23%; H, 6.37%; N, 5.23%.

The O-tetrahydropyranyl-(D)-mandelic acid imidazolide used as starting material was prepared in the following way:

8.6 g. (D)-mandelic acid were added to 19 g. freshly distilled dihydropyran and 110 ml. benzene and this then mixed with 200 mg. p-toluene-sulphonic acid; the resulting reaction mixture heated up and the (D)-mandelic acid thereby went into solution. After 3 hours, 100 ml. benzene were added and the reaction mixture washed several times with 2 N sodium carbonate solution and water. The benzene solution was dried over anhydrous sodium sulphate and the benzene thereafter distilled off in a vacuum. As residue there were obtained 21.5 g. of the tetrahydropyranyl ester of O-(tetrahydropyranyl)-(D)-mandelic acid in the form of a viscous, colorless oil which was further worked up without purification.

21.5 g. of this crude product were heated under reflux on a steam bath for 2 hours in 200 ml. 50% methanol with 4.0 g. sodium hydroxide. The methanol was subsequently distilled off in a vacuum and the aqueous solution of the sodium salt of O-tetrahydropyranyl-(D)-mandelic acid extracted with ether. The ether was discarded. The remaining aqueous solution was concentrated in a vacuum to about 50 ml., cooled to 0° C. and mixed with the calculated amount of oxalic acid (6.3 g. as the hydrate). The O-tetrahydropyranyl-(D)-mandelic acid was extracted from its aqueous solution by shaking using 5 portions of 100 ml. methylene chloride. After drying over anhydrous sodium sulphate at 0° C., the methylene chloride solution was concentrated in a vacuum to 100 ml. To the solution so obtained there were added 12 g. N,N′-carbonyl-diimidazole; a vigorous evolution of carbon dioxide thereby commencing. After 30 minutes, the solution was evaporated to dryness in a vacuum. As residue, there were obtained 22.3 g. of viscous oil, comprising a mixture of imidazole and the imidazolide of O-tetrahydropyranyl-(D)-mandelic acid which was further worked up without additional purification.

EXAMPLE 2.—18-(L)-MANDELIC ACID ESTER OF RESERPIC ACID METHYL ESTER (a) 7.7. g. methyl reserpate were reacted with 13 g. crude imidazolide of O-tetrahydropyranyl-(L)-mandelic acid and 0.86 g. sodium hydride in 95 ml. anhydrous dimethyl formamide in a manner analogous to that described in Example 1 and the reaction product further worked up. There were obtained 16.2 g. of residue which was homogenous in the thin layer chromatogram. It was obtained in crystalline form from benzene and, after recrystallization from acetone, the 18-(O-tetrahydropyranyl)-(L)-mandelic acid ester of reserpic acid methyl ester was obtained in the form of colorless crystals having a melting point of 226–227° C.; $[\alpha]_D^{20} = 92.1 \pm 1.2°$ (c.=1% in methanol).

Analysis.—$C_{36}H_{44}N_2O_8$ (M.W. 632.75). Calc.: C, 68.33%; H, 7.01%; N, 4.43%. Found: C, 68.01%; H, 6.77%; N, 4.42%.

(b) 4.0 g. of the 18-(O-tetrahydropyranyl)-(L)-mandelic acid ester of reserpic acid methyl ester in a mixture of 300 ml. methanol and 60 ml. methylene chloride were mixed with 2.2 g. p-toluene-sulphonic acid and allowed to stand in the dark under nitrogen for 20 minutes at 40° C. Following the addition of 100 ml. water, the reaction mixture was neutralized with ammonia and then highly concentrated in a vacuum. The concentrated solution was again diluted with 200 ml. water, rendered alkaline with ammonia and extracted several times with methylene chloride. From the methylene chloride extracts, there were obtained, in a manner analogous to that described in Example 1b, 3.8 g. of a residue which was then recrystallized from isopropanol. There were obtained 3.0 g. of the 18-(L)-mandelic acid ester of reserpic acid methyl ester in the form of colorless crystals having a melting point of 256–257° C. Upon further recrystallization, the melting point remained unchanged;

$[\alpha]_D^{20} = -139.6 \pm 0.6°$ (c.~1% in chloroform).

Analysis.—$C_{31}H_{36}N_2O_7$ (M.W. 548.6). Calc.: C, 67.86%; H, 6.62%; N, 5.10%. Found: C, 67.97%; H, 6.49%; N, 5.12%.

The imidazolide of O-tetrahydropyranyl-(L)-mandelic acid required as starting material was prepared using a manner analogous to that used for the preparation of the corresponding D-mandelic acid derivative (see Example 1).

EXAMPLE 3.—18 - (D)- AND -(L) - 3',4' - DIMETHOXYMANDELIC ACID ESTER OF RESERPIC ACID METHYL ESTER (a) 7.6 g. of the unpurified imidazolide of O-tetrahydropyranyl - DL - 3,4 - dimethoxymandelic acid (prepared in a manner analogous to that described in Example 1) and 6.13 g. reserpic acid methyl ester were dissolved in 120 ml. anhydrous dimethyl formamide and mixed with 0.86 g. of a 50% suspension of sodium hydride in paraffin oil. After 15 minutes, the reserpic acid methyl ester could no longer be detected in the thin layer chromatogram. The reaction mixture was then mixed with 500 ml. benzene and extracted with 1.5 liters ice water. The aqueous phase was again extracted with 500 ml. benzene. The combined benzene solutions were washed with water and dried over anhydrous sodium sulphate. After distilling off the benzene, there were obtained 9.7 g. yellowish 18-(O-tetrahydropyranyl)-DL-3',4'-dimethoxymandelic acid ester of reserpic acid methyl ester which was not further purified. The aforesaid residue consisted of a mixture of the two diastereomeric esters.

(b) 9.0 g. of the mixture of the diastereomeric 18-(O-tetrahydropyranyl)-3',4'-dimethoxymandelic acid esters of reserpic acid methyl ester were dissolved in 75 ml. methanol and mixed, under nitrogen, with 2.5 g. p-toluenesulphonic acid. After 20 minutes, the splitting off of the tetrahydropyranyl radical had ended. The reaction mixture was diluted with 1 liter water, rendered alkaline with ammonia and extracted several times with methylene chloride. After working up in the usual way, there were obtained 7.05 g. of residue which, on being crystallized from a mixture of isopropanol and methanol, gave 4.2 g. of crystals having a melting point of 195–200° C. The crystals consisted preponderantly of one of the two diastereomeric 18-(3',4'-dimethoxymandelic acid esters) of reserpic acid methyl ester. The crystals were recrystallized from methanol/methylene chloride. The melting point was thereby increased to 227–229° C.;

$$[\alpha]_D^{20} = -146 \pm 0.5°$$

(c.~1% in chloroform+20% methanol).

Analysis.—$C_{33}H_{40}N_2O_9 \cdot 0.5$ $CH_3OH$ (M.W. 624.7). Calc.: C, 64.42%; H, 6.77%; N, 4.49%. Found: C, 64.42%; H, 6.92%; N, 4.58%.

The combined mother liquors were chromatographed on neutral silicic acid gel. Elution was carried out with benzene to which increasing amounts of alcohol were added. The other diastereomer was eluted with benzene+3% alcohol (2.7 g. crude product). After recrystallization from methanol-isopropanol, there were obtained colorless crystals having a melting point of 230–231° C.; $[\alpha]_D^{20} = -51.4 \pm 0.5°$ (c.~1% in chloroform).

Analysis.—$C_{33}H_{40}N_2O_9 \cdot 0.5$ $CH_3OH$ (M.W. 624.7). Calc.: C, 64.42%; H, 6.77%; N, 4.49%. Found: C, 64.59%; H, 6.42%; N, 4.80%.

The imidazolide of (O-tetrahydropyranyl)-DL-3,4-dimethoxymandelic acid required as starting material was prepared in a manner analogous to that described in Example 1.

EXAMPLE 4.—18-(3',4',5'-TRIMETHOXYMANDELIC ACID ESTER) OF RESERPIC ACID METHYL ESTER (a) 9.6 g. crude imidazolide of (O-tetrahydropyranyl)-DL-3,4,5-trimethoxymandelic acid and 5 g. reserpic acid methyl ester were dissolved in 60 ml. anhydrous dimethylformamide and mixed with 0.58 g. of a 50% suspension of sodium hydride in paraffin oil. After standing for 3 hours at 5° C., the reaction mixture was diluted with 1 liter water and extracted with methylene chloride. After working up the methylene chloride solution in the usual manner, there were obtained 9.2 g. 18-O-tetrahydropyranyl-DL-3',4',5'-trimethyloxymandelic acid ester in the form of an almost colorless foam which was further worked up without additional purification.

(b) 8.8 g. crude 18-O-(O-tetrahydropyranyl)-DL-3',4',5'-trimethoxymandelic acid ester of reserpic acid methyl ester were dissolved in 250 ml. methanol, mixed with 4.8 g. p-toluene-sulphonic acid and allowed to stand under nitrogen at 40° C. for 20 minutes. After diluting the reaction mixture with water, it was extracted with ether. The ether was discarded. The aqueous phase was made alkaline with ammonia and extracted several times with methylene chloride. Following the usual working up, the methylene chloride yielded 7.93 g. of an almost colorless amorphous residue which, following thin layer chromatography, was established as consisting of about equal amounts of the two diastereomeric 18(3',4',5'-trimethoxymandelic acid esters) of reserpic acid methyl ester. The diastereomers could be separated by column chromatography on aluminum oxide with benzene-methylene chloride mixtures. The heavier substance which was elutable from the column (3.8 g.) crystallized from isopropanol; after recrystallization from methanol, there were obtained colorless crystals having a melting point of 220° C.; $[\alpha]_D^{20} = -113.8 \pm 0.6°$ (c.~1% in chloroform).

Analysis.—$C_{34}H_{42}N_2O_{10}$ (M.W. 638.7). Calc.: C, 63.93%; H, 6.63%; N, 4.38%. Found: C, 63.92%; H, 6.84%; N, 4.58%.

The imidazolide of O-tetrahydropyranyl-DL-3,4,5-trimethoxymandelic acid used as starting material was prepared from 3,4,5-DL-trimethoxymandelic acid (colorless crystals from benzene which melted at 120–124° C.) in a manner analogous to that described in Example 1.

EXAMPLE 5.—18 - α - HYDROXY-CYCLOHEXANECARBOXYLIC ACID ESTER OF RESERPIC ACID METHYL ESTER (a) 22.4 g. of the crude imidazolide of α-tetrahydropyranyloxy-cyclohexane-carboxylic acid and 10 g. reserpic acid methyl ester in 100 ml. dimethyl formamide were mixed with 1.15 g. of a 50% suspension of sodium hydride in paraffin oil and allowed to stand for 4 hours in a refrigerator. The reaction mixture was thereafter diluted with 700 ml. water and shaken out with 4–200 ml. portions of methylene chloride. The methylene chloride extracts were washed with water, dried over anhydrous sodium sulphate and distilled off in a vacuum. There were obtained 20.85 g. of a foamy residue which was chromatographed on 200 g. basic aluminum oxide of activity stage III, using benzene as eluant. The 18-(α-tetrahydropyranyloxy)-cyclohexane-carboxylic acid ester of reserpic acid methyl ester was first eluted from the column. The yield amounted to 15.39 g. Acording to the thin layer chromatogram, the colorless foam obtained was homogeneous and was further worked up without additional purification.

(b) 39.5 g. of the amorphous 18-(α-tetrahydropyranyloxy)-cyclohexane-carboxylic acid ester of reserpic acid methyl ester were dissolved in 500 ml. methanol and acidified with methanolic hydrochloric acid. The reaction mixture was allowed to stand under carbon dioxide for 30 minutes in an ice bath and the splitting off of the tetrahydropyranyl radical thereupon being completed. The reaction mixture was diluted with 2000 ml. ice water and shaken out once with 100 ml. ether. The ether was discarded. The aqueous phase was subsequently rendered alkaline with ammonia and shaken out several times with methylene chloride. After working up in the usual way, there were obtained about 32 g. of an amorphous residue which was chromatographed on 300 g. basic aluminum oxide of activity stage III for the removal of impurities. 4.55 g. of a by-product, 24.8 g. of an almost colorless material were eluted with benzene which, upon treatment with 250 ml. ether, yielded 11.7 g. 18-α-hydroxycyclohexane-carboxylic acid ester of reserpic acid methyl ester having a melting point of 210° C. Further amounts of this product could be isolated from the mother liquor. After recrystallization of the crude crystallizate from ethyl acetate-ether (1.2), here were obtained colorless crystals which melted at 226–228° C.

*Analysis.*—$C_{30}H_{40}N_2O_7$ (M.W. 540.7). Calc.: C, 66.66%; H, 7.46%; N, 5.18%. Found: C, 66.42%; H, 7.45%; N, 5.37%.

The imidazolide used as starting material was prepared in the following way:

Cyclohexanone cyanhydrin was reacted with dihydropyran and the α-tetrahydropyranyloxy-cyclohexane-carboxylic acid nitrile so obtained (B.P. 105° C./0.8 mm. Hg) subjected to alkaline saponification yielding α-tetrahydropyranyloxy-cyclohexane-carboxylic acid which was converted into the imidazolide in a manner analogous to that described in Example 1.

The compounds of the invention have particularly interesting pharmacological properties constituting particularly effective blood pressure reducing, sedative and tranquilizing agents. In order to establish the pharmacological activities of the new compounds and to better evaluate these activities as compared to a known compound, the following procedures were carried out using in that connection the compounds as hereinafter set out:

(1) 18-α-hydroxy-cyclohexane-carboxylic acid ester of reserpic acid methyl ester (2) 18-(L)-mandelic acid ester of reserpic acid methyl ester (3) 18-(D)-mandelic acid ester of reserpic acid methyl ester (4) 18-(3′,4′,5′-trimethoxy mandelic acid ester) of reserpic acid methyl ester (5) Reserpine-comparison compound.

I. Effect on the central nervous system (CNS)

(a) The *sedative* effect was determined on the basis of the potentiation of thiopental narcosis in the mouse by Taeschler's method (J. Pharmacol. Exper. Ther. 120, 179, 1959). The $ED_{50}$ in mg. per kg. of body weight was determined 30 and 240 minutes after subcutaneous injection of the test compounds, in order to follow the course of the sedation obtained.

(b) The *tranquilizing effect* was evaluated on the basis of the inhibition of secondarily caused reactions (SCR) in the rat by the procedure of Maffii (J. Pharm. Pharmacol. 11, 129, 1959). Three to four groups of 10 rats each were tested 4 to 6 hrs. after subcutaneous injection of various doses of the test compounds, each group being tested 5 times. The $ED_{50}$ in mg. per kg. of body weight, which is set out in Table I was determined from the percentage of inhibition at the various dosages.

The object and purpose of the tests were to be able to specify the *working character* of the tested compounds as a selective tranquilization. The lower the quotient obtained by dividing the $ED_{50}$ of the SCR inhibition by the $ED_{50}$ of the thiopental narcosis, the closer one approaches these aims.

II. Blood pressure reduction (a) In rabbits under urethane narcosis.—The blood pressure was measured at a femoral artery. Both of the depressor nerves were severed. At intervals both of the carotid arteries were clamped shut and arterenol injected. The carotid sinus unloading reflexes were carried out before the intravenous injection of 0.5 mg. per kg., of the compounds being tested, as well as 60 to 90 minutes thereafter, and also 60 to 90 minutes after injection of arterenol. Preliminary experiments have shown that the effect has completely developed by this time.

In each individual experiment, the normal blood pressure and the increase in pressure during release before administration of the compound being tested were taken as equal to 100, and the decrease in these pressures after 60 to 90 minutes was calculated as a percentage. The median value as reported in the table represents 4–6 evaluations.

(b) In hypertonic rats.—The hypertonia was produced in the animals by repeated injection of DOCA and the addition of sodium chloride to the food. The blood pressure was measured under ether anaesthesia. An inflatable rubber cuff was applied to the root of the tail, and the pulsations at the tip of the tail were recorded with the pulsometer as described by Brecht and Boucke (Arch. Exper. Path u. Pharmakol. 225, 190, 1955). The pressure was measured at which the first pulsations occurred. The table gives the decrease of blood pressure in mm. of mercury 2 hours after s.c. injection of 2 mg. ker kg. At least 10 animals were used in each group.

The results of these procedures are set out in the table.

TABLE

| Substance | Thiopental-narcosis | | Inhibition of secondarily caused reactions (SCR) | $ED_{50}$ SCR/ $ED_{50}$ thiopental narcosis | Rabbit decrease | | Increase arterenol | Rat blood pressure reduction |
| --- | --- | --- | --- | --- | --- | --- | --- | --- |
| | 30 min. | 240 min. | | | Blood pressure | CSU | | |
| Reserpine-comparison compound | 7.0(4.8–10.2) | 0.1(0.04–0.2) | 0.8(0.6–1.0) | 8 | 25 | 62 | 48 | 37 |
| 18-α-hydroxycyclohexanecarboxylic acid ester of reserpic acid methyl ester | 9.1(6.1–13.6) | 7.7(4.7–12.6) | 0.56(0.4–1.3) | 0.07 | 16 | 31 | 35 | 24 |
| 18-(L)-mandelic acid ester of reserpic acid methyl ester | 4.1(2.9–6.8) | 3.8(1.9–7.6) | 7.7(5.6–10.6) | 2 | 22 | 54 | 19 | 24 |
| 18-(D)-mandelic acid ester of reserpic acid methyl ester | 13.0(7–24.1) | ~10 | 8.3(5.4–12.7) | 0.8 | 15 | 45 | 32 | 28 |
| 18-(3′,4′,5′-trimethoxymandelic acid ester of reserpic acid methyl ester | >40 | >40 | >5 | | 22 | 41 | 25 | 37 |

The values reported in the table are median values each obtained from 5–10 experimental procedures. Said values represent the decrease in blood pressure in mm. Hg 2 hours after subcutaneous injection of the test substances. The test substances were administered in the following amounts:

Dose (mg./kg. s.c.)
(1) 18-α-hydroxy-cyclohexane-carboxylic acid ester of reserpic acid methyl ester _____ 3.0
(2) 18-(L)-mandelic acid ester of reserpic acid methyl ester _____ 10.0
(3) 18-(D)-mandelic acid ester of reserpic acid methyl ester _____ 10.0
(4) 18-(3′,4′,5′-trimethoxy mandelic acid ester) of reserpic acid methyl ester _____ 1.0
(5) Reserpine-comparison compound _____ 1.0

With reference to the effect on the central nervous system

From the table the superiority of the test compounds of the application over reserpine can be seen from the following findings:

(a) 18-α-hydroxy-cyclohexane-carboxylic acid ester of reserpic acid methyl ester.—Inhibited secondarily caused reactions in the rat in substantially smaller doses than did reserpine.

(b) On the basis of a specific tranquilizing effect, all of the tested compounds with the exception of 18-(3′,4′,5′-trimethoxy mandelic acid ester) of reserpic acid methyl ester, which was centrally ineffective, were superior to the reserpine control.

(c) Reserpine is characterized by the fact that its effect sets in very slowly. The $ED_{50}$ in the thiopental test in each case with the exception of 18-(3′,4′,5′-trimethoxy mandelic acid ester of reserpic acid methyl ester was identical, which indicates a substantially faster onset of effect. In the case of reserpine, a shorter working compound is involved, its effect having ceased after 4 hours.

With reference to blood pressure reduction

All of the compounds in accordance with the invention which were tested acted to reduce blood pressure but to a lesser degree than did reserpine. This is manifest particularly in connection with the CSU (Carotis-sinus-release reflex), the same constituting a particularly sensitive criteria for evaluating influence on blood pressure.

The onset of the blood pressure reduction as well as the distinct lessening of the CSU and the intensification of the arterenol effected are characteristic of the reserpine-type action mechanism.

18-(3',4',5'-trimethoxy mandelic acid ester) of reserpic acid methyl ester reduced the blood pressure of hypertonic rats to the same degree as reserpine. However, 18-α-hydroxy-cyclohexane-carboxylic acid ester of reserpic acid methyl ester;
18-(L)-mandelic acid ester of reserpic acid methyl ester;
18-(D)-mandelic acid ester of reserpic acid methyl ester were, in spite of the considerably higher dose, less effective than was the comparison compound.

It is apparent from the data that the test substances with the exception of 18-(3',4',5'-trimethoxy mandelic acid ester) of reserpic acid methyl ester all demonstrated central activity. They acted specifically as sedatives and tranquilizers and, in this connection, were superior to reserpine. This is particularly the case with 18-α-hydroxy-cyclohexane-carboxylic acid ester of reserpic acid methyl ester. In addition, the tested compounds had a shorter duration of effectiveness. All of the test compounds behaved as hypotensives because of reserpine type effect. In the rabbits all of the test compounds of the application were considerably less effective than reserpine. However, the tests carried out with the rats present criteria for a quantitative gradation. In this regard, reserpine and/or 18-(3',4',5'-trimethoxy mandelic acid ester of reserpic acid methyl ester had an equal effect. The other compounds, namely, 18-α-hydroxy-cyclohexane-carboxylic acid ester of reserpic acid methyl ester;
18-(L)-mandelic acid ester of reserpic acid methyl ester; and
18-(D)-mandelic acid ester of reserpic acid methyl ester had a distinctly lesser effect on the blood pressure than did reserpine.

The compositions of the invention are put up in any suitable dosage form such as tablets or the common powder mix papers, or capsules, for oral administration. They can also be administered intravenously and intramuscularly. For parenteral use or in the capsules or tablets, the composition need only consist of the selected 18-hydroxy-yohimbane carboxylic acid diester of the type described herein as having a hypotensive or sedative effect. In the case of the tablet there is included a suitable binder compatible with the principal ingredient and non-toxic when taken in the amount and frequency resulting from the administration regimen of the preparation. In the case of the injectable, the compound is administered in the form of its solution or suspension in water or other aqueous menstruum, i.e., aqueous suspending medium, or in any of the commonly used oil menstruums, i.e., oil suspending media.

We claim:
1. 18-(D)-3',4'-dimethoxymandelic acid ester of reserpic acid methyl ester.
2. 18-(L)-3',4'-dimethoxymandelic acid ester of reserpic acid methyl ester.
3. 18-(DL)-3',4',5'-trimethoxymandelic acid ester of reserpic acid methyl ester.
4. 18-(D)3',4',-5'-trimethoxymandelic acid ester of reserpic acid methyl ester.
5. 18-(L)-3',4',5'-trimethoxymandelic acid ester of reserpic acid methyl ester.
6. 18-α-hydroxy-cyclohexane-carboxylic acid ester of reserpic acid methyl ester.

References Cited

UNITED STATES PATENTS 2,789,112  4/1957  Taylor.
2,789,113  4/1957  Taylor.
2,995,556  8/1961  Lucas.

OTHER REFERENCES

Ban et al.: Chemical Abstracts, vol. 62 (1965), pages 7820–1.

JAMES A. PATTEN, Primary Examiner

U.S. Cl. X.R.

260—286; 424—200, 262